United States Patent
Spizig et al.

(10) Patent No.: US 7,877,816 B2
(45) Date of Patent: Jan. 25, 2011

(54) SCANNING PROBE IN PULSED-FORCE MODE, DIGITAL AND IN REAL TIME

(75) Inventors: Peter Spizig, Niederstotzingen (DE); Detlef Sanchen, Neu-Ulm (DE); Jörg Förstner, Ulm (DE); Joachim Koenen, Ulm (DE); Othmar Marti, Ulm (DE); Gerhard Volswinkler, Laupheim (DE)

(73) Assignee: Witec Wissenschaftliche Instrumente und Technologie GmbH, Ulm (DE)

(*) Notice: Subject to any disclaimer, the term of this patent is extended or adjusted under 35 U.S.C. 154(b) by 424 days.

(21) Appl. No.: 11/584,843

(22) Filed: Oct. 23, 2006

(65) Prior Publication Data

US 2007/0114406 A1    May 24, 2007

Related U.S. Application Data

(63) Continuation-in-part of application No. 10/433,917, filed as application No. PCT/EP01/14593 on Dec. 12, 2001, now Pat. No. 7,129,486.

(60) Provisional application No. 60/738,903, filed on Nov. 22, 2005.

(30) Foreign Application Priority Data

Dec. 13, 2000  (DE) ................ 100 62 049
Nov. 22, 2005  (DE) ............ 10 2005 055 460

(51) Int. Cl.
*G01N 13/12*    (2006.01)

(52) U.S. Cl. .............. 850/10; 850/5; 850/8; 850/21; 977/850; 977/851; 977/852; 977/860

(58) Field of Classification Search ........... 250/306, 250/307, 309, 310, 311; 73/105
See application file for complete search history.

(56) References Cited

U.S. PATENT DOCUMENTS

| 5,224,376 A |  | 7/1993 | Elings et al. |
| 5,412,980 A |  | 5/1995 | Elings et al. |
| 5,477,732 A |  | 12/1995 | Yasue et al. |
| 5,519,212 A |  | 5/1996 | Elings et al. |
| 5,805,448 A |  | 9/1998 | Lindsay et al. |
| 6,215,121 B1 | * | 4/2001 | Fujihira et al. .............. 250/306 |
| 7,234,342 B2 | * | 6/2007 | Proksch et al. ................ 73/105 |

FOREIGN PATENT DOCUMENTS

| DE | 44 37 081 | 4/1995 |
| DE | 197 28 357 | 1/1999 |
| DE | 199 00 114 | 8/2000 |

(Continued)

OTHER PUBLICATIONS

Juanjo Lacort et al., "An integrated controller for a flexible and wireless Atomic Force Microscopy", VLSI Circuits and Systems II, vol. 5837, pp. 321-328, Jun. 30, 2005.

(Continued)

*Primary Examiner*—Jack I Berman
*Assistant Examiner*—Meenakshi S Sahu
(74) *Attorney, Agent, or Firm*—Baker & Daniels LLP

(57) ABSTRACT

Microscope, in particular a scanning probe microscope, comprising a programmable logic device.

21 Claims, 4 Drawing Sheets

FOREIGN PATENT DOCUMENTS

| | | |
|---|---|---|
| WO | 02/48644 | 6/2002 |
| WO | 2004/057303 | 7/2004 |

OTHER PUBLICATIONS

P. Maivald, et al., "Using force modulation to image surface elasticities with the atomic force microscope", Nanotechnology 2 (1991), pp. 103-106.

Manfred Radmacher, et al., "Imaging Adhesion Forces and Elasticitiy of Lysozyme Adsorbed on Mica with the Atomatic Force Microscope", Langmuir, vol. 10, No. 10 (1994), pp. 3809-3814.

Joachim P. Spatz, et al., "Forces affecting the substrate in resonant tapping force microscopy", Nanotechnology 6 (1995), pp. 40-44.

Y. Martin, et al., "Atomic force microscope-force mapping and profiling on a sub 100-Å scale", J. Appl. Phys., vol. 61, No. 10, (1987) pp. 4723-4729.

Manfred Radmacher, et al., "Mapping Interaction Forces with the Atomic Force Microscope", Biophysical Journal, vol. 6 (1994), pp. 2159-2165.

H.A. Mizes, et al., Submicron probe of polymer adhesion with atomic force microscopy: Dependence on topography and material imhomogeneities, Appl. Phys. Lett., vol. 59, No. 22, (1991), pp. 2901-2903.

Kees O. van der Werf, et al., "Adhesion force imaging in air and liquid by adheision mode atomic force microscopy", Appl. Phys. Lett., vol. 65, No. 9, (1994), pp. 1195-1197.

Krotil, H. et al.: "Pulsed Force Mode: a New Method for the Investigation of Surface Properties", Surfaces and Interface Analysis, 1999, pp. 336-340.

Lacort, Juanjo et al., "An integrated controller for a flexible and wireless Atomic Force Microscopy", VLSI Circuits and Systems II, 2005.

Marti, O. et al., "Control Electronics for Atomic Force Microscopy", 1988 American Institute of Physics, Review of Scientific Instruments, Jun. 1988, No. 6, New York, NY.

Dror Sarid, et al., "Driven nonlinear atomic force microscopy cantilevers: From noncontact to tapping modes of operation", J. Vac. Sci. Technol. B 14(2), (1996), pp. 864-867.

Dr. Paul Profos, et al., "Handbuch der industriellen Meÿtechnik", vol. 5, (1992), pp. 205-206.

O. Marti, et al., "Reibungsmikroskopie", Phys. Bl. 48 (1992) Nr. 12, pp. 1007-1009.

A. Rosa et al., "The simultaneous measurement of elastic, electrostatic and adhesive properties by scanning force microscopy: pulse-force mode operation", Meas. Sci. Technol. 8 (1997) pp. 1-6.

\* cited by examiner

SCANNING PROBE IN PULSED-FORCE MODE, DIGITAL AND IN REAL TIME

CROSS-REFERENCE TO RELATED APPLICATION

This is a continuation-in-part of application Ser. No. 10/433,917 filed Dec. 1, 2003, which is a 371 of PCT/EP01/14593 filed Dec. 12, 2001. This application also claims the benefit under Title 35, U.S.C. §119(e) of the U.S. Provisional Patent Application Ser. No. 60/738,903, filed on Nov. 22, 2005.

BACKGROUND OF THE INVENTION

Prior Art

The invention relates to a method for producing the image of a surface of a specimen to be examined with a resolution which is better than 1 pm laterally to the surface and better than 100 nm perpendicularly to the surface, with a scanning probe scanning the surface point by point and the distance between the scanning probe and the specimen surface being modulated at each scanning point, thus leading to a force-time curve. The invention also provides a scanning probe microscope for performing such a method.

A large number of methods for imaging the surfaces of specimen pieces by means of scanning probes have already been described in the state of the art.

One possibility for examining a specimen surface and for producing a surface image by means of a scanning probe is that the scanning probe is brought into contact with the surface of the specimen and the surface of the specimen is then scanned. Such an imaging method is known as "contact-mode" and is used for example for determining the topography and the local friction. With respect to the "contact-mode method", reference is hereby made to the following publications:

Maivald P, Butt H-J, Gould S A C, Prater C B, Drake B, Gurley J A, Elings V B and Hansma P K (1991), Using force modulation to image surface elasticities with the atomic force microscope, Nanotechnology, 2, 103-105, and Marti 0 and Colchero J, 1992, "Reibungsmikroskopie" (Frictional Microscopy), "Phys. Rafter" 48, 107, the disclosure of which shall be fully included in the present application.

The disadvantage of this imaging method is that when moving the scanning probe which is in contact with the surface of the specimen piece, shearing forces will occur which deform the surface of soft specimens such as polymeric or biological systems or can even destroy the same.

In order to protect a surface from deformation or destruction it is advantageous to examine the specimen surface with the help of a method in which the scanning probe is not in contact with the same. This method is generally known in literature as "non-contact mode". It is a method with which a destruction of the specimen surface can be excluded entirely. One disadvantage of this method is however that the resolution decreases with increasing distance between scanning probe and specimen surface and no mechanical specimen properties can be examined.

Reference is hereby made with respect to the "non-contact mode", the disclosure of which is hereby fully included in the present application:

Martin Y, Williams C C and Wickramsinghe H G. (1987), Atomic force microscope-force mapping and profiling on a sub 100-A scale, J. App. Phys., 61, 4723;

Sarid D, Ruskell T G, Workman R K and Chen D, 1996, J. Vac. Sci. Technol. B, 14, 864-7.

A method which allows the examination of soft specimen surfaces such as those of polymers but which on the other hand still offers sufficient information on the specimen surface is the so-called "intermediate-contact-mode" method, in which a scanning probe can be made to oscillate close to its natural frequency. The oscillating scanning probe is moved towards the specimen until it touches the specimen surface. The phase shift between the free oscillation in air and the oscillation when the scanning probe approaches the surface depends on the elastic-viscous properties of the probe and the adhesive potential between specimen and scanning probe. In this way it is possible to determine the elastic properties.

Reference is hereby made with respect to the "intermediate-contact-mode" method to the following:

Spatz J, Sheiko S,-Moller M, Winkler R, Reineker P and Marti 0, (1995), Forces affecting the substrate in the resonant tapping force microscopy, Nanotechnology, 6, 40-44

Digital Instruments, Incorporated, U.S. Pat. No. 5,412,980 (1995), Tapping atomic force microscope Digital Instruments, Incorporated, U.S. Pat. No. 5,519,212 (1996), Tapping atomic force microscope with phase or frequency detection, whose disclosure is hereby fully included in the present application.

The "intermediate-contact-mode" method comes with the disadvantage that the two variables, amplitude and phase shift, depend on a plurality of variables, so that a simple allocation to a physical variable is not possible.

These disadvantages can be overcome in such a way that the entire force-path or force-time curve is absorbed when the scanning probe approaches the specimen surface. This curve comprises the entire information of the interaction forces between scanning probe and specimen and allows a precise definition of the elastic-viscous properties and the adhesive forces.

Concerning this method reference is hereby made to:

Radmacher M, Cleveland J P, Fritz M, Hansma H G and Hansma P K, (1994) Mapping interaction forces with the atomic force microscope, Biophys. J, 66, 2159-65;

Radmacher M, Fritz M, Cleveland J P, Walters D A and Hansma P K, (1994 Imaging adhesion forces and elasticity of lysozyme adsorbed on mica with the atomic force microscope, Langmuir 10, 3809-14;

Van der Werf K 0, Putman C A J, Groth B G and Greve J (1994), Adhesion force imaging in air and liquid by adhesion mode atomic force microscopy, Appl. Phys. Left, 65, 1195-7;

Mizes H A, Loh K-G, Miller R J D, Ahujy S K and Grabowskie E F (1991), Submicron probe of polymer adhesion with atomic force microscopy; dependence on topography and material inhomogeneities, Appl. Phys. Lett. 59, 2901-3 whose disclosure is hereby fully included in the present application.

The disadvantageous aspect in this method is that the scanning speed for recording an image is very low.

In order to increase this speed a new method was developed, the so-called "pulsed-force-mode" microscopy. In "pulsed-force-mode" (PFM) microscopy, the scanning probe is made to oscillate periodically in the z direction, i.e. the perpendicular direction relative to the specimen surface, and the force-time curve, which is an image of the force-path curve, is recorded and certain parameters of this force-time curve are evaluated with the help of analog circuits such as trigger circuits in order to obtain an image of the specimen surface.

Concerning the "pulsed-force-mode" microscopy reference is hereby made to:

Rosa A, Weiland E, Hild S and Marti O, The simultaneous measurement of elastic, electrostatic and adhesive properties by scanning force microscopy; "pulsed-force-mode-operation". Meas. Sci. Technol. 8, (1997), 1-6 whose disclosure is fully included in the present application.

The disadvantageous aspect in the imaging method of a specimen with the help of the "pulsed-force" microscopy as has become known from the state of the art, e.g. through the above document, is that triggers need to be placed for processing the analog signals. Since the evaluation of the pulsed-force curve is substantially limited to the time of the occurrence of the triggers, this leads to inaccuracies and optimal signals can only be obtained with difficulty.

Moreover, the setting of the triggers requires skilled staff and is very time-consuming.

A further disadvantage in the "pulsed-force" microscopy according to the current state of the art is that the possibilities for evaluating the force curves is very limited and thus remain inaccurate. As a result, it is possible to obtain quantitative measured values which are relevant from a viewpoint of material sciences only with much difficulty.

Moreover, the method is limited to a maximum of two variables which can be evaluated per measurement made with scanning microscopy, which is often inadequate.

Other embodiments of scanning probe microscope comprises at least one peripheral electrical component, such as for instance a D/A or A/D converter and a programmable logic device. One particular programmable logic device is a so-called programmable gate array (FPGA), Preferably, in the present invention the programmable logic device is developed an FPGA.

The scanning probe microscope preferably serves to generate the image of a surface of a sample being analyzed. In images of this kind the resolution can be better than 1 μm lateral to the surface and better than 100 mm perpendicular to the surface. The scanning probe scans the surface point-by-point. In one application, which serves only as an example and is not to be seen as limiting the scope of the invention in any way, the distance between the scanning probe and the sample surface is periodically modulated, such that for instance a force-time curve results. This force-time curve can then be evaluated and the development of different surface parameters can be ascertained. A scanning probe can also be an optical probe for directing light onto a surface to be scanned, for instance by means of a cantilever tip into which laser light is coupled. With respect to near field scanning optical microscopy reference is made to U.S. Pat. No. 5,756, 977, DE 19902235 A1 and DE 19902234 A1. A further form of optical scanning probe microscopy is scanning probe Raman spectroscopy/microscopy.

Consequently, in the present application scanning probe microscopy is very generally defined as a microscope whereby a sample surface is scanned point-by-point. Therefore, this definition of the scanning probe microscope and scanning probe microscopy include for instance confocal microscopy, scanning force microscopy, scanning tunneling microscopy, optical near-field microscopy and also scanning electron microscopy. Accordingly, scanning probe microscopy is not restricted to scanning probe microscopy involving a force-time curve being recorded with the aid of a scanning probe. Consequently, the description of the invention for a scanning probe microscope for recording force-time curves only serves to describe the invention better by means of an example, but in no way restricts the scope of the invention. Scanning probe microscopy for recording force-time curves is just a preferred embodiment and is not a restriction.

If in a scanning probe microscope as in the state of the art, the peripheral components are actually controlled by means of controllers or microcomputers via a data bus system, such a transfer of data by means of a bus system has numerous disadvantages.

As the controllers or the digital signal processors (DSP) control the peripheral devices, such as for instance the D/A converters, the A/D converters or the digital input and output devices via a bus or a plurality of buses, developed as multi-drop buses, these must be provided with electronic digital technology for controlling access to the bus of for instance the controller or the microprocessor and for decoding the requests from the microcontroller or the digital signal processor. In addition, synchronizing the analog/digital converters and/or the digital/analog converters and the digital input and output devices requires further logic components in order for instance to synchronize a scanning movement involving the simultaneous movement of more than one channel and to simultaneously measure the values for each scanning point. Furthermore, the circuits require complex terminals to maintain the integrity of the data.

WO2004/057303 makes known a controller for a scanning probe microscope that employs a programmable logic device in the form of FPGAs. However, in WO2004/057303 it is not the entire programmable logic control unit that is developed as a programmable logic device, but just one part, namely the lock-in amplifier, developed in the programmable logic device as a digital two-phase lock-in amplifier. This fully digital programmable logic lock-in amplifier is connected to a digital signal processor that, in turn, is part of the controller. The programmable logic device in WO2004/057303 in the form of an FPGA is only an auxiliary component of the digital signal processor for signal processing and not the controller itself. Consequently, the signal processor in WO2004/057303 encompasses the scanning probe microscope controller for controlling the control circuits and the entire scanning probe microscope scan and not the programmable logic. The digital signal processor communicates with all peripheral devices by means of a multi-drop bus.

A further disadvantage of these kinds of systems in accordance with the state of the art is their inflexibility. If one wishes to add a new state-of-the-art peripheral device to the system it is necessary to calibrate the bus timing again as the additional data load resulting from the system automatically puts an extra load on the bus system. The bottleneck caused by this bus system also constitutes a bottleneck for the digital signal processor or the microcontroller as only one command or just a few parallel commands can ever be executed in the microcontroller or processor. Furthermore, every peripheral device in a state-of-the-art system with a multi-drop bus is constructed in a very complex manner as parts of the peripheral component are required to implement the bus protocol used by the multi-drop bus, for instance address decoding or bus arbitration. Furthermore, circuit termination for more than two circuits for a bus system is very complex and elaborate.

SUMMARY OF THE INVENTION

Consequently, an object of the invention is to overcome the disadvantages of the state of the art and provide a scanning probe microscope that features rapid data collection, data processing and high flexibility.

In accordance with the invention this object is achieved by means of a microscope, in particular a scanning probe microscope, where at least two peripheral devices are linked directly with a programmable logic device without the interconnection of a multi-drop bus.

With respect to programmable logic reference is made to:
Ashok K. Sharma: "Programmable Logic Handbook: PLDs, CPLDs and FPGAs (McGraw-Hill 5 Professional Publishing; ISBN: 0070578524)" or
W. Bolton, Bill Bolton: "Programmable Logic Controllers: An Introduction" (Butterworth-Heinemann; ISBN: 0750647469).

A programmable logic device comprises a large number of logic components and/or logic elements and/or logic switches, such as for instance AND gates, OR gates, flip-flops or memory elements. The single logic components can be interconnected using a netlist and by means of freely configurable circuits in accordance with a circuit diagram. In contrast to AISEC modules, this interconnection is not permanent, but can be modified at any time using the netlist. Free configurability requires a high degree of flexibility. The logic components are interconnected using activated transistors that are activated in accordance with the netlist, which is a representation of the circuit diagram. Complete microprocessors or digital signal processors (CUSP) can be represented in programmable logic with the aid of appropriate logic component interconnections. These are known as softcores or IP soft cores. It is also possible to integrate hardware processors or digital signal processors into a programmable logic device. Hardwired processors or digital signal processors are also known as hard IP cores.

A structure of this kind provides the scanning probe microscope with great flexibility as the central control unit of the system in accordance with the invention is developed as a programmable logic device. Consequently, when a peripheral component is added or exchanged, only the programmable logic has to be reconfigured using the netlist, not the hardwired architecture of the system. It is no longer necessary to calibrate the peripheral components to match the bus architecture. In comparison with bus architecture, one is far more able to interface the individual peripheral components directly with the programmable logic device using a star topology. The star circuitry allows the peripheral components with extreme data transmission rates in excess of 100 kHz to be driven and controlled in parallel mode. Consequently, digital log-in amplifiers for instance can be developed in the range of several MHz. While the control response time for previous systems was in the range of its, thanks to the use of programmable logic in the system in accordance with the invention this lies in the range of ns. This makes it possible for instance to count individual photons, such that the apparatus in accordance with the invention can be employed for instance in confocal microscopy, i.e., in optical scanning probe systems with time resolution.

For the first time, this invention makes it possible to develop a controller as a system on a chip or even on a programmable chip. In this manner, a star topology can be developed which simplifies routing considerably in comparison with systems in accordance with the state of the art employing a bus. Furthermore, the noiselessness of the converters and electromagnetic compatibility is improved. Elaborate terminals such as for multi-drop busses are no longer required. The system can be easily expanded as no address decoding or arbitration logic is required. Timing behavior is totally deterministic.

Using the scanning probe microscope in accordance with the invention employing programmable logic, where the controller is also represented in the programmable logic device, it is possible to control the probe movement in 2 or 3 dimensions, to measure quantities such as for instance light intensity, photon numbers, electrical currents and differentials and mechanical quantities such as for instance forces, deformation, oscillation amplitudes and phases, positions, and spectra during probe movement, and to control these with reference to set values. Furthermore, various switches, relays, stepper or DC motors, cameras, luminaries, shutters, folding mirrors, electrical voltages for combined experiments and the like can also be controlled. Analog crosspoints are no longer required to control the different switches, relays, stepper or DC motors etc. Instead, a multiplexer developed within the programmable logic device can be employed.

In controlling probe movement, parallel control of the axes of the scanning probe microscope is possible, that is along the two axes on the X-Y plane and also along the Z axis, along which height data is obtained.

The parallel control of scan movement and closed-loop feedback provides smoother movement than in comparison with the state of the art as a central processing unit does not need to switch back and forth between various tasks.

Furthermore, it is also possible to synchronize external devices, such as CCD cameras, with the scanning. A further advantage of the system is its simple maintenance.

Consequently, as the complete system is developed as a programmable logic device, It is possible in many cases to carry out maintenance tasks on the customer's premises solely by accessing the netlist by means of software, as the netlist defines the programmed logic circuitry.

Furthermore, so-called EMC behavior is improved with respect not only to the electromagnetic radiation, but also to the noise immunity as most of the data processing, in particular the high frequency digital data processing in the programmable logic device, developed as an FPGA chip, takes place at very low voltages between 1.2 Volt and 1.5 Volt. As the number of external digital circuits is restricted to a minimum, the signal/noise ratio of the analog inputs and outputs is also improved. Preferably, the programmable logic device and/or the field programmable gate arrays (FPGA) or a programmable logic device employing an embedded CPU, a programmable logic device employing an embedded microcontroller or a programmable logic device with a digital signal processor is/are interconnected by means of netlists, such that the programmable logic device processes all the parallel tasks simultaneously.

Thanks to its open configurability, the scanning probe microscope described here with its programmable logic offers the advantage that the scanning probe microscope can be provided with new or extended functionality, without modifications to the hardwired electronics. The scanning probe microscope is developed as a system on a programmable chip.

Reconfiguration is for instance possible using a microcomputer by means of a modified netlist within a few seconds. This makes it possible for instance to add new, faster components in a simple manner.

To do so, the netlist only needs to be modified with respect to the corresponding logic.

Within the scope of the present application, interfaces are also peripheral devices. Examples of interfaces are the RS232 interface, the IEEE interface, the TCP/IP interface, the Ethernet interface or a USB interface. The aforementioned interfaces are connected directly to the programmable logic device without the interconnection of a data bus.

In a first embodiment in accordance with the invention, the scanning probe microscope comprises one or a plurality of A/D converters, one or a plurality of D/A converters, and one or a plurality of digital input/output terminals.

Preferably, the A/D converters have a width of 14 bit or more, for instance 16 bit, and a clock speed in excess of 100 ksamples/s, preferably in excess of 1 Msamples/s or more than 5 Msamples/s. Preferably, each measurement wire and/or control wire has its own designated A/D converter. There is then no longer any need for an analog multiplexer, which reads in measured data from a plurality of data channels and transmits these to a single A/D converter. By dispensing with the analog multiplexer the signal-noise ratio for the individual data channels is improved and crosstalk between various data channels prevented.

In one particularly preferred embodiment the device comprises at least five analog/digital converters. Preferably, the number of D/A converters exceeds four. The D/A converters are provided with a width of 14 bit or more and also a sampling rate in excess of 100 ksamples/s, preferably in excess of 5 Msamples/s, preferably 50 Msamples/s.

In one preferred embodiment the scanning probe microscope is provided with three D/A converters, with one D/A converter generating an offset on one analog output and the second D/A converter generating the reference voltage for the third D/A converter and the analog addition of the outputs from the first and third converters constituting the actual analog output. Highly preferable is when the D/A converters of a scanning probe microscope can be digitally controlled by a programmable logic device and one or a plurality of closed loop control systems can be developed using A/D converters and D/A converters. In particular, it is an advantage when a positioning device for positioning and scanning can be actuated and/or controlled in one, two or three dimensions.

The digital input and output interface can be provided by means of a TTL wire, an RS232 interface, a I2C interface, an Ethernet interface or a USB interface. The input/output interface (DIO) and/or the output interface (DO) in one preferred embodiment of the invention can serve to control stepper motors, folding mirrors, filter wheels, filter sliders, lasers, shutters, spectrometers, spectrographs, counters, on/off switches, CCD cameras and scanning systems and/or read in or read out data from these systems. The interfaces can also be interfaces that create connections to peripheral devices, developed as microcomputers or digital signal processors. A connection of this kind can be made by means of an Ethernet, CCP/IP, USS or an interface with data buffering employing FIFO. The data transfer rate exceeds 10 Mbytes, preferably above 20 Mbytes. A connection to other programmable logic networks is also possible.

The invention can be employed in every type of microscope, in particular in a scanning probe microscope, in particular also in a scanning force microscope, a scanning tunneling microscope, a near-field scanning optical microscope, a confocal laser scanning microscope, a confocal scanning microscope, a confocal Raman scanning microscope, a photonic force microscope or a scanning electron microscope. A scanning probe microscope in accordance with the invention can for instance be employed for recording and evaluating force distance curves.

A microscope of this kind will be described subsequently purely as an example that in no way limits the scope of the invention.

Force distance curves can be used to separately measure diverse sample parameters with a single measurement, such as for instance viscous, adhesive and elastic behavior. As the force distance curves are fully available in digital form at the end of a measurement and therefore available for post-processing if required, the stored data are also available for subsequent analysis of measurement artifacts.

In one embodiment of the invention the frequency of the periodic movement of the scanning probe for recording force distance curves in the direction perpendicular to the sample surface 1 Hz to 20 kHz and the amplitude ties within the range of 10 to 500 nm. More advantageously, sinusoidal or similarly shaped forms of excitation are selected, but other forms of excitation such as sawtooth or trapezoidal can also be advantageous. An analysis of the actual movement of the scanning probe makes it possible to modify or change the form of the excitation in such a manner that the probe executes the desired periodic movement.

The force distance curves can be used to determine the characteristic quantity, for instance the maximum repulsive force value from the digitized force-time curve that results while the scanning probe is in contact with the surface.

A further characteristic quantity that can be determined is the difference between one point in the rising or falling branch of the force-time curve in relation to maximum force. This difference is then a quantifiable measure of the local stiffness of the sample and offers a stiffness image of the surface when entered on the scanned area.

A further characteristic quantity from the force-time curve is the minimum attractive force while the tip is detaching from the sample surface. This characteristic value is a quantifiable measure for the local adhesion of the sample and produces an adhesion image of the surface when it is entered over the scanned region. A further characteristic quantity that can be determined is the minimum force value when the sample probe snaps onto the sample surface. This minimum force value is a quantifiable measure of the local attraction of the sample. If this characteristic quantity is entered over the scanned region, an attraction image of the sample can be obtained. Stiffness images of the sample can also be determined in another manner from the recorded force-time curve. In a first embodiment, a stiffness image is obtained in such a way that the slope of the force-time curve at a certain time when pressing the sample probe into the sample surface is determined as a characteristic quantity. This slope is a quantifiable measure of the local stiffness of the sample.

As an alternative to this, the slope can be determined at a specific relative time of the force-time curve when the sample probe is retracted from the sample. This slope is also a quantifiable measure for the local stiffness of the sample and results In a stiffness image of the same when entered over the scanned region.

A further characteristic quantity is the frequency of the free oscillation of the cantilever. This quantity is a quantifiable measure for the collected impurities or damage to the tip.

A further characteristic quantity of the digitized force-time curve is the ratio between the minimum force value when detaching from the sample surface and the measured force value at the first subsequent local force maximum. This characteristic value is a quantifiable measure for the energy dissipation when detaching the tip from the sample.

If one determines the rise time from the beginning of the contact until the maximum force from the force-time curve, it is possible to generate a rise time image of the sample surface. Employing an analogous method it is possible to obtain a fall time image of the sample surface by determining the fall time from the digitized force-time curve. Furthermore, the time of the repulsive contact between sample and tip or the time of contact between sample and tip can be determined from the digitized force-time curve. When entered over the scanned region, these times lead to a repulsive contact image or a contact time image of the sample surface. In a similar manner as for the contact periods in the repulsive region of the force curve, a refined embodiment of the invention provides for contact periods for the adhesive section of the force curve to be determined, for instance from the force minimum to the zero crossing of the force curve.

When entered on the scanned region, these periods generate a contact-breaking period image of the sample surface, In addition to the direct evaluation of the force-time curve, it is possible to determine various integrals under the force-time curve as characteristic quantities. For example, it is possible on the basis of the digitized curve to determine the integral under the force-time curve in the region of the repulsive contact or from the beginning of the contact until reaching the maximum force and from reaching the maximum force until the zero crossing of the force. When entered over the scanned region, these integral values offer a repulsive contact integral image of the sample; in the case of the integral from the beginning of the contact until reaching the maximum force, an image of the work exerted on the sample and in the case of the integral from the time of reaching the maximum force until the zero crossing, an image of the work provided by the sample.

Similar to the integrals in the repulsive region, integrals for the adhesive region of the force curve can also be determined from the digitized force-time curves. It is possible for instance to determine the area under the force curve from the time of minimum force until the time of the zero crossing of the force curve. This integral is a measure for the local viscoelastic properties of the sample.

If one calculates the difference between the integrals in the region of the repulsive contact and the integral under the force-time curve from the beginning of contact until reaching the maximum force, an image can be produced of the work dissipated in the sample.

One or a plurality of the obtained evaluation results can be used as a control signal for tracking the scanning probe on the sample topography or for controlling the modulation signal. Preferably, the difference between the maximum repulsive force value and the force value obtained when the scanning probe is close to but not yet I\in contact with the sample is usually used as the control signal for tracking the scanning probe on the sample topography. It is also advantageous and possible to use other quantities.

If the digitized force-time curves are stored in a memory area, certain variables of the force-time curve can be determined by post-processing. The quantities as described above, that is the force-time curve and each position of the sampling platform and the force-time curve data, can be stored with temporal information. This is known as a timestamp. If the quantities are stored with this timestamp, for instance in a memory area of the FPGA, a parametric representation of the complete scanning measurement results. In prior systems, the sampling platform was for instance brought into a certain position, a spectrum recorded at this position, for instance using scanning Raman microscopy with the aid of a CCD camera, the recorded data was stored, and the sampling platform then brought into a second position. If, on the other hand, the position of the sampling platform is given a timestamp, as are the measurement data, the positional displacement of the sampling platform and the measurement data from for instance the CCD camera, can be recorded continuously and independently of each other. The timestamp allows the data to be correlated in any way, it is no longer necessary to have a trigger as was the case in prior systems, for instance displacing the sampling platform and recording the measurement data. This significantly accelerates the recording of measurement data. Furthermore, different views can be calculated from the stored data. As described above, it is no longer absolutely necessary to synchronize the data on the hardware side thanks to the timestamp, as it can be produced at any subsequent time in the software. Consequently, using this method it is also possible to distort the image based on a specified position using the actual measured position. In the scanning probe microscope described above for recording force-time curves, it is advantageous for the oscillating movement of the scanning probe perpendicular to the sample surface to be excited with the help of a piezoelectric element, Alternatively, provision can be made for the scanning probe to comprise a tip arranged on a beam and the means for recording the force-time curve and means for measuring the beam deflection, for instance with the aid of the deflection of a laser beam. The deflection of the laser beam is preferably measured using a quadrant detector or a position-sensitive photodiode. The invention is described below with reference to the drawings.

It is a further object of the present invention to provide an imaging method for an apparatus comprising a scanning probe which allows on the one hand recording a plurality of physical properties both quantitatively as well as qualitatively during a measurement made with a scanning microscope and provides on the other hand an image in a short period of time and with sufficient precision.

The invention shall also enable for the first time more complex variables such as constant maximum force (by taking into account measurement artifacts produced by interference or long-range forces for example), constant energy supply, constant penetration depth, etc. or combinations of such variables for control. The change between different control parameters should be possible. In order to make all parameters contained in the force-time curves accessible for the measurement and to increase the measurement precision in a number of material parameters, the invention shall further allow an active control of signal shape, phase, frequency and amplitude of the modulation signal.

This object is achieved in accordance with the invention in such a way that in the case of a method according to the preamble of claim 1 the force-time curve recorded with the help of the pulsed-force mode is digitized at each scanning point and is subjected to a realtime evaluation with the help of digital signal processing and programmable logic with a time interval! shorter than the period. Moreover, in a preferable embodiment the data stream can be forwarded to a further computer unit for online evaluation and for storage for post-processing purposes.

In the present application the following shall apply:

Realtime evaluation shall be understood as being an evaluation of a digital data stream and the provision of the result(s) within a fixedly predetermined time interval. If the result of the evaluation is to be used as an actual value for a controller, such a realtime evaluation shall be necessary in order to minimize the controller deviations.

Online evaluation shall be understood as being an evaluation of a data stream occurring parallel to the data stream without the necessity of providing a result within a predetermined time interval. This is advantageous when one wishes to make a statement on the success of the measurement already during a measurement. In this case, a processing of the measured data that occurs in parallel is necessary.

Post-processing shall be understood in the present application as an evaluation of a data stream previously stored on a data storage medium such as a harddisk of a computer without any restrictions concerning the time requirements.

The digitization of the force-time curve and the evaluation by means of programmable logic allows determining from the force-time curve one or several characteristic variables of the force-time curve both in realtime as well as online according to control necessities as well as within the scope of post-processing for each scanning point according to definition. It is then possible to build up images of the properties of the specimen surface from said characteristic variables. By including the entire curve in the evaluation instead of individual curve points it is possible, in addition to building up an image with the help of characteristic variables, to also use them for deriving certain quantitative physical properties.

The active production and control of the modulation signal in the invention, which is in contrast to the classical pulsed-force method, allows influencing the modulation curve shape, phase, amplitude and frequency, either interactively during the measurement or automatically controlled by control parameters.

As a result, a plurality of methods become applicable by the invention for the evaluation of the force-distance curves, which methods allow, in contrast to previous measuring methods, detecting and distinguishing between a large variety of specimen parameters within a single measurement such as viscous, adhesive and elastic behavior. Since the force-distance curves are present in a completely digital form at the end of a measurement and thus can also optionally be subjected to a time-consuming post-processing process, the stored data are also available for subsequent clarification of measurement artifacts. At the same time, online evaluation allows a momentary success check at the time of measurement. In comparison with the "pulsed-force" microscopy according to the previously cited state of the art, more comprehensive evaluation methods can be used.

The possibility appears to be advantageous in that the number of variables used for the control and otherwise is no longer subjected to any limitations and the change from one evaluation method to another only needs to be made by software and no longer by the exchange of hardware as in the state of the art.

Especially preferably, the frequency of the periodic movement of the scanning probe is 1 Hz to 20 kHz in the direction perpendicular to the specimen surface and the amplitude is in the region of 10 to 500 nm. Advantageously, sinusoidal or sinus-like excitations are chosen. Other excitations such as saw-tooth-like or trapezoid can also be advantageous. An analysis of the actual movement of the scanning probe allows modifying or changing the shape of the excitation in such a way that the probe performs the desired periodic movement.

The starting point for the image build-up is the determination of the zero line as a characteristic variable. The zero line can vary from point to point due to far-reaching electrostatic forces. The zero line can be determined from the force value of the force-time curve which is obtained when the scanning probe is close to the specimen surface, but is not yet in contact with the same.

All further characteristic variables are obtained from the force-time curve by taking into account this base or zero line.

In a first embodiment of the invention it can be provided that the maximum repulsive force value is determined as a further characteristic variable from the digitized force-time curve which is obtained while the scanning probe is in contact with the surface.

It is provided for in a further embodiment of the invention that the difference between a point in the rising or falling branch of the force-time curve to the maximum force is designated as a characteristic variable. This difference is then a quantifiable measure for the local stiffness of the specimen and offers a stiffness image of the surface when entered on the scanned region.

In a further embodiment of the invention it can be provided that the minimum attractive force value on detaching the tip from the specimen surface is determined as a characteristic variable from the force-time curve. This characteristic variable is a quantifiable measure for the local adhesion of the specimen and leads to an adhesion image of the surface when it is entered over the scanned region.

The minimum force value when snapping the specimen probe onto the specimen surface can be determined as a further characteristic variable from the digitized force-time curve. Said minimum force value is a quantifiable measure for the local attraction of the specimen. If this characteristic variable is entered over the scanned region, an attraction image of the specimen can be obtained, Stiffness images of the specimen can also be determined in another manner from the recorded force-time curve. In a first embodiment, a stiffness image is obtained in such a way that the slope of the force-time curve at a certain time when pressing the specimen probe into the specimen surface is determined as a characteristic variable. This slope is a quantifiable measure for the local stiffness of the specimen.

As an alternative to this, the slope can be determined at a specific relative time of the force-time curve when the specimen probe is pulled away from the specimen. This slope is also a quantifiable measure for the local stiffness of the probe and leads to a stiffness image of the same when entered over the scanned region.

It may be provided for in a further embodiment of the invention that the frequency of the free oscillation of the cantilever is detected as the characteristic variable. This is a quantifiable measure for the collected impurities or damage to the tip.

The ratio between the minimum force value when detaching from the specimen surface and the measured force value on the first following local force maximum can be determined as a further characteristic variable. This characteristic variable is a quantifiable measure for the energy dissipation when detaching the tip from the specimen.

When one determines from the force-time curve the rise time from the beginning of the contact up to the maximum force, it is possible to generate a rise time image of the specimen surface. It is analogously possible to obtain a fall time image of the specimen surface by determining the fall time from the digitized force-time curve.

In a further development of the invention it may be provided that the time of the repulsive contact between specimen and tip or the time of contact. between specimen and tip is determined from the digitized force-time curve which is also recorded. When entered over the scanned region, these times lead to a repulsive contact image or a contact time image of the specimen surface.

Similar to the contact periods in the repulsive region of the force curve, contact periods for the adhesive portion of the force curve, e.g. from the force minimum to the zero crossing of the force curve, can be determined in a further development of the invention.

When entered on the scanned region, these periods lead to a contact-breaking period image of the specimen surface.

In addition to the direct evaluation of the force-time curve, it is possible to determine various integrals under the force-time curve as characteristic variables. For example, it is possible on the basis of the digitized curve to determine the integral under the force-time curve in the region of the repulsive contact or from the beginning of the contact until reaching the maximum force and from reaching the maximum force until the zero crossing of the force. When entered over the scanned region, these integral values offer a repulsive contact integral image of the specimen; in the case of the integral from the beginning of the contact until reaching the maximum force, an image of the work provided on the specimen and in the case of the integral from the time of reaching the maximum force until the zero crossing, an image of the work provided by the specimen.

Similar to the integrals in the repulsive region, integrals for the adhesive region of the force curve can also be determined from the digitized force-time curves.

It is possible for example to determine the surface area under the force curve from the time of minimum force up to the time of zero crossing of the force curve.

This integral is a measure for the local elastic-viscous properties of the specimen.

When calculating the difference of the integrals in the region of the repulsive contact and the integral under the force-time curve from the beginning of the contact until reaching the maximum force, an image can be produced of the work dissipated in the specimen.

It is particularly advantageous when the characteristic variables determined from the force-time curve are stored in a second memory area by allocating the various measuring and scanning points.

As a result of realtime evaluation, the invention allows obtaining a statement very rapidly for the very first time as to whether or not the momentarily performed measurement is occurring successfully because the digitized force-time curve which is evaluated in realtime is available to the user either immediately, i.e. during the running measurement as an electric signal which can be tapped externally from the device and can thus be read in by any kind of AFM controller, or visualized by the control computer.

In addition to the method in accordance with the invention, the invention also provides an apparatus for performing the method, with the scanning probe microscope for performing the method being characterized in that the apparatus comprises an analog-to-digital converter in order to digitize the recorded force-time curve and in order to enable the determination of predetermined characteristic variables from the digitized force-time curve in realtime.

One or several of the obtained realtime evaluation results can be used as a control signal for tracking the scanning probe on the specimen topography or for controlling the modulation signal. Preferably, the difference between the maximum repulsive force value and the force value obtained when the scanning probe is close to but not in contact with the specimen is used as the control signal for tracking the scanning probe on the specimen topography. It is advantageously also possible to use other variables.

If the digitized force-time curves are stored in a memory area, certain variables of the force-time curve can be determined by post-processing.

The oscillating movement of the scanning probe perpendicular to the specimen surface is excited with the help of a piezoelectric element.

Furthermore, it is provided for in a first embodiment that the scanning probe comprises a tip arranged on a beam and the means for recording the force-time curve comprise means for measuring the beam deflection, e.g. with the help of the deflection of a laser beam.

BRIEF DESCRIPTION OF THE DRAWINGS

The invention is to be described below by way of examples shown in the drawings, wherein.

DETAILED DESCRIPTION

Figure 1:
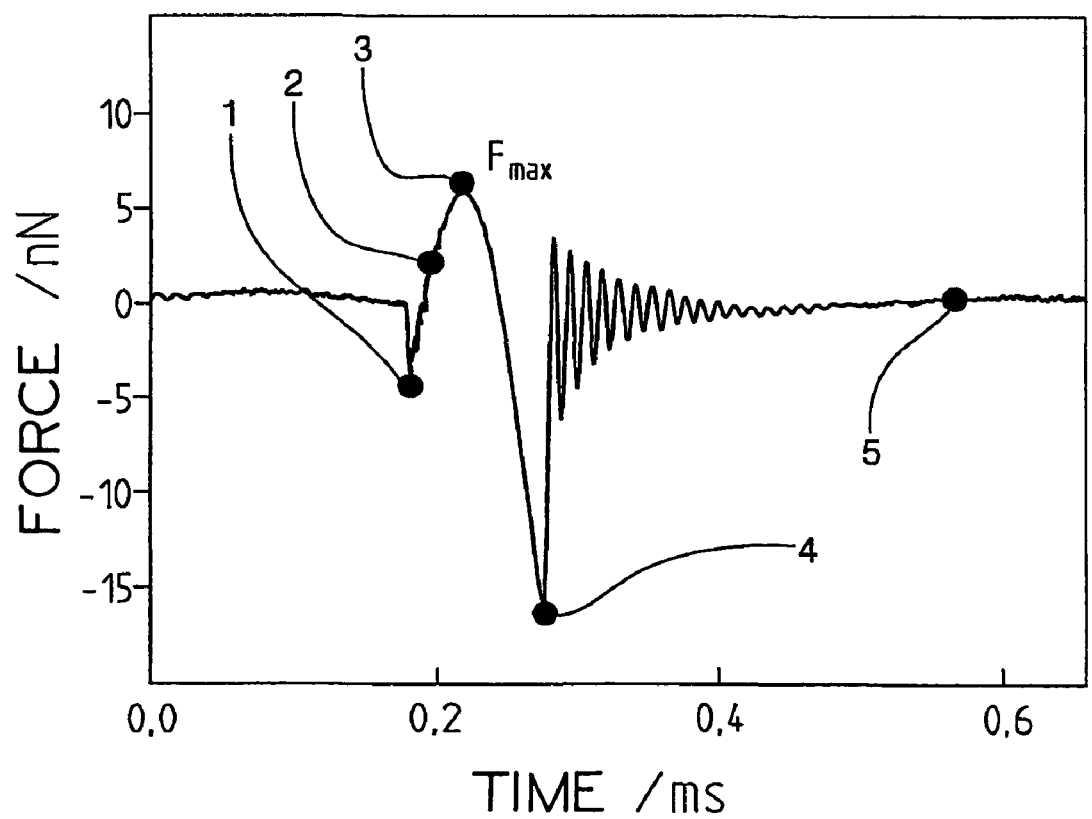
FIG. 1 shows a characteristic curve of a force-time curve.

FIG. 1 shows the characteristic progress of a force-time curve as obtained after passing through an oscillation period of a scanning probe, which in the present case is a probe tip arranged on a beam. The oscillation amplitude of the oscillation of the scanning probe tip as excited by means of a piezoelectric element lies between 10 and 500 nm and the oscillation frequency between 1 Hz and 5 kHz, and in the present case in the region of 1 kHz.

FIG. 1 clearly shows the characteristic regions of the force-time curve which arises, when excited, perpendicular to the specimen surface. Said regions can be used for determining the characteristic variables and, when applied to the scanned region, lead to the different forms of image of the specimen surface.

The function as illustrated in FIG. 1 is already standardized on the base or zero line, which means that the force value of the base line of the scanning probe is set to zero. The base line can be determined in such a way that the region of the force-time curve is determined in which the force value no longer changes. This value, which is provided with the reference numeral 5 in this case, is set to zero. Relative to this, one determines the other force values of the curve.

The scanning probe is moved towards the specimen surface at first. After approximately 0.2 milliseconds the probe comes into contact with the specimen due to the negative attractive forces between scanning probe and specimen. Once the tip is in contact with the specimen, force is continued to be exerted by the piezoelectric element on the scanning probe or the tip and the tip is thus driven into the specimen or specimen surface. The repelling repulsive forces increase strongly and reach a maximum at point 3. After a preset path or a preset maximum force value $F_{max}$, the scanning probe is no longer driven into the specimen but pulled back by the piezoelectric element from the specimen. Due to the adhesive forces, it comes out of contact with the specimen only after reaching the force minimum at point 4 and passes over into a free oscillation. The free oscillation decays until the base line 5 is reached.

The cycle is then repeated again.

The progress of the force-time curve is principally the same for all specimens which are examined with the help of the "pulsed-force microscopy". However, it is possible to determine characteristic variables from the curve for the respective specimen or for the respective point of the probe, which variables, when composed, lead to an image of the specimen surface depending on the various physical parameters.

As a result, the difference between point 2 in the ascending branch of the force-time curve and the maximum force is a quantifiable measure for the local stiffness of the specimen. When this characteristic variable is evaluated from the recorded force-time curve according to the invention, one can thus obtain a local stiffness image of the specimen.

The minimum attractive force value 4 when detaching the tip from the specimen surface is again a quantifiable measure for the local adhesion of the specimen and offers an adhesion image when applied to the scanned region.

The minimum force value when latching the scanning probe onto the specimen surface in point 1 is a quantifiable measure to the local attraction of the specimen and leads to an attraction image of the surface when applied to the scanned region. From the rise times from the start of the contact until the maximum force and the fall time from the maximum force until reaching the zero crossing lead to rise and fall time images of the specimen surface.

The invention also allows evaluating integral variables. As a result, the integral under the force-time curve can be determined in the region of the repulsive contact and the integral under the force-time curve from the start of the contact until reaching the maximum force in point 3. If these two integral values are deducted from each other, one obtains a quantifiable statement on the work dissipated in the specimen.

Figure 2:
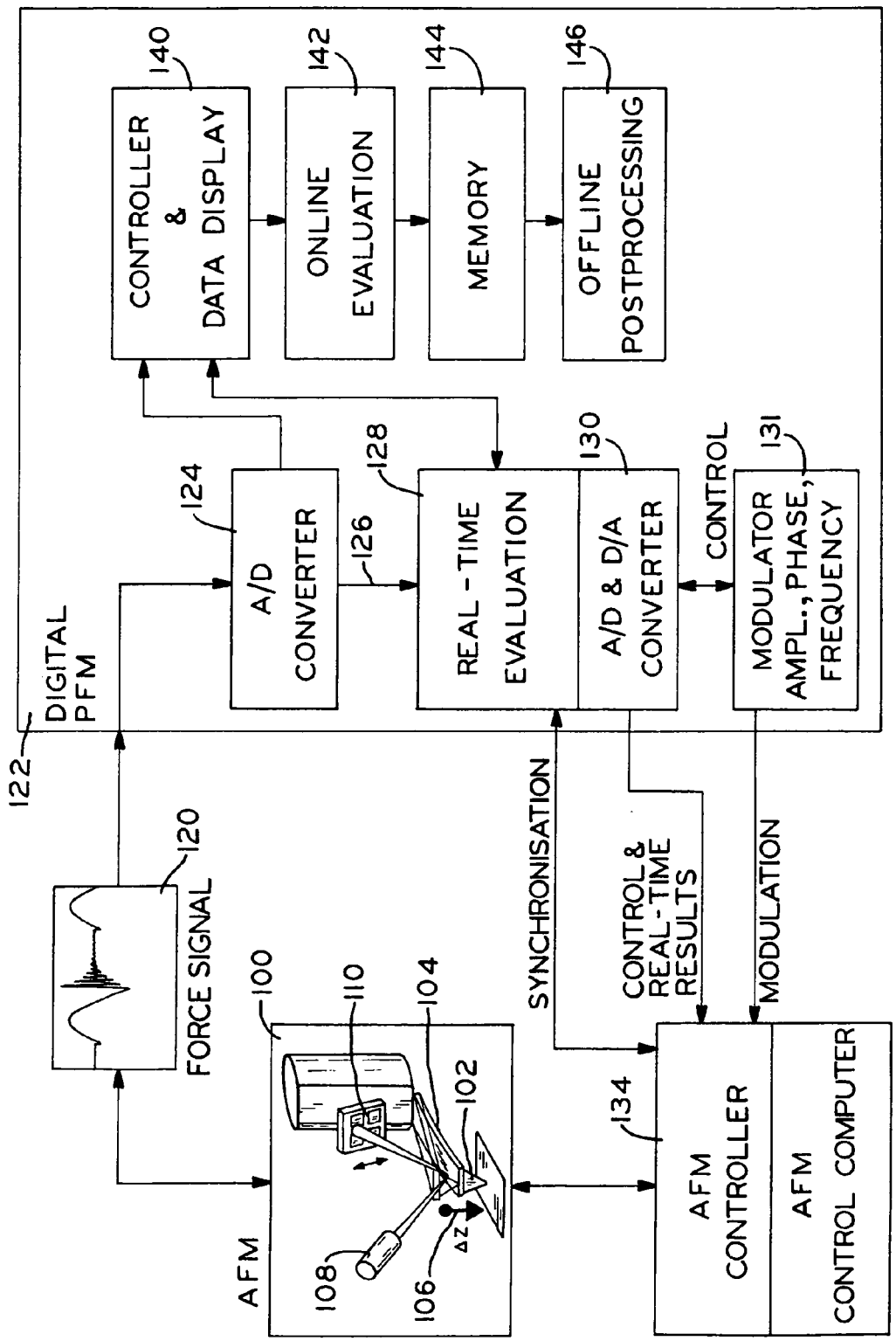
FIG. 2 shows a block diagram of a scanning probe microscope in accordance with the invention.

FIG. 2 shows by way of an example a block diagram of the configuration of a scanning probe microscope in accordance with the invention which is operated in "pulsed force mode". The scanning probe microscope is designated with reference numeral 100. The scanning probe microscope comprises a scanning probe 102 which is usually a tip. The scanning probe is suspended on a beam 104. The scanning probe is made to oscillate in the z direction 106, i.e. in the perpendicular direction relative to the specimen surface. The deflection of the beam 104 on which the tip 102 is arranged is evaluated by a beam which is emitted by a laser diode 108 and is detected by a four-quadrant detector 110. The analog force measurement signal which is obtained by the deflection of the beam 104 which is also designated as cantilever is provided with reference numeral 120. The analog force signal 120 is supplied to a control unit 122 according to the invention. The control unit 122 comprises an analog-to-digital converter 124 which converts the analog data of the force signal 120 into a digital data stream 126. The digital data stream is evaluated by means of a realtime evaluating unit 128 in realtime by means of programmable logic unit for example. Realtime shall be understood in such a way that the result of the evaluation is obtained in a guaranteed fashion within a fixedly predetermined interval, i.e. in this case not later than until the end of the current modulation cycle, so that the result can be used as an actual value for a controller. The programmable logic unit can be realized by "field programmable gate arrays" (so-called FPGAs) for example. Such programmable logic units have been described for example in Ashok K. Sharma: "Programmable Logic Handbook: PLDs, CPLDs and FPGAs (McGraw-Hill Professional Publishing; ISBN: 0070578524)" or in "W. Bolton, Bill Bolton: Programmable Logic Controllers: An Introduction (Butterworth-Heinemann; ISBN: 0750647469)".

With the help of realtime evaluation 128 it is possible, once the evaluated digital signal had been converted back into an analog signal again in the digital-to-analog converter 130, to use for controlling purposes the constant maximum force (by taking into account interferences or measuring artifacts caused by far-reaching forces), the constant energy introduction, constant penetration depth, etc., or combinations of such variables.

An external analog signal such as a set-point value predetermined by the AFM controller can also be included by the analog-to-digital converter 130 in the calculation of the actual value for the controller. The control variables are sent by the controller of the scanning probe microscope 134 to the scanning probe microscope 100 for tracking the tip 102 on the beam 104.

It is the task of the modulator 131 to produce the vertical oscillation of the measuring tip which is necessary for "pulsed force mode". The digital configuration allows using any desired shape of curve for the modulation. By providing a close linkage to the aforementioned realtime evaluation, it is possible to have an influence which is automatically controlled by control parameters on phase, amplitude and frequency of the modulation in addition to an interactive intervention by the user. This allows the correction of piezoelectric non-linearities of the scanning probe microscope.

In addition to realtime control or tracking of the scanning probe 104, the realtime evaluation with the help of the module 128 also allows the synchronous evaluation of characteristic data in the module 140 and thus an online check or evaluation 142 of the measurement. Furthermore, a memory area 144 can be provided to which the digital data stream can be saved. The data stream 144 saved to the memory can be executed offline in a post-processing process 146 after the measurement has been completed.

Figure 3:
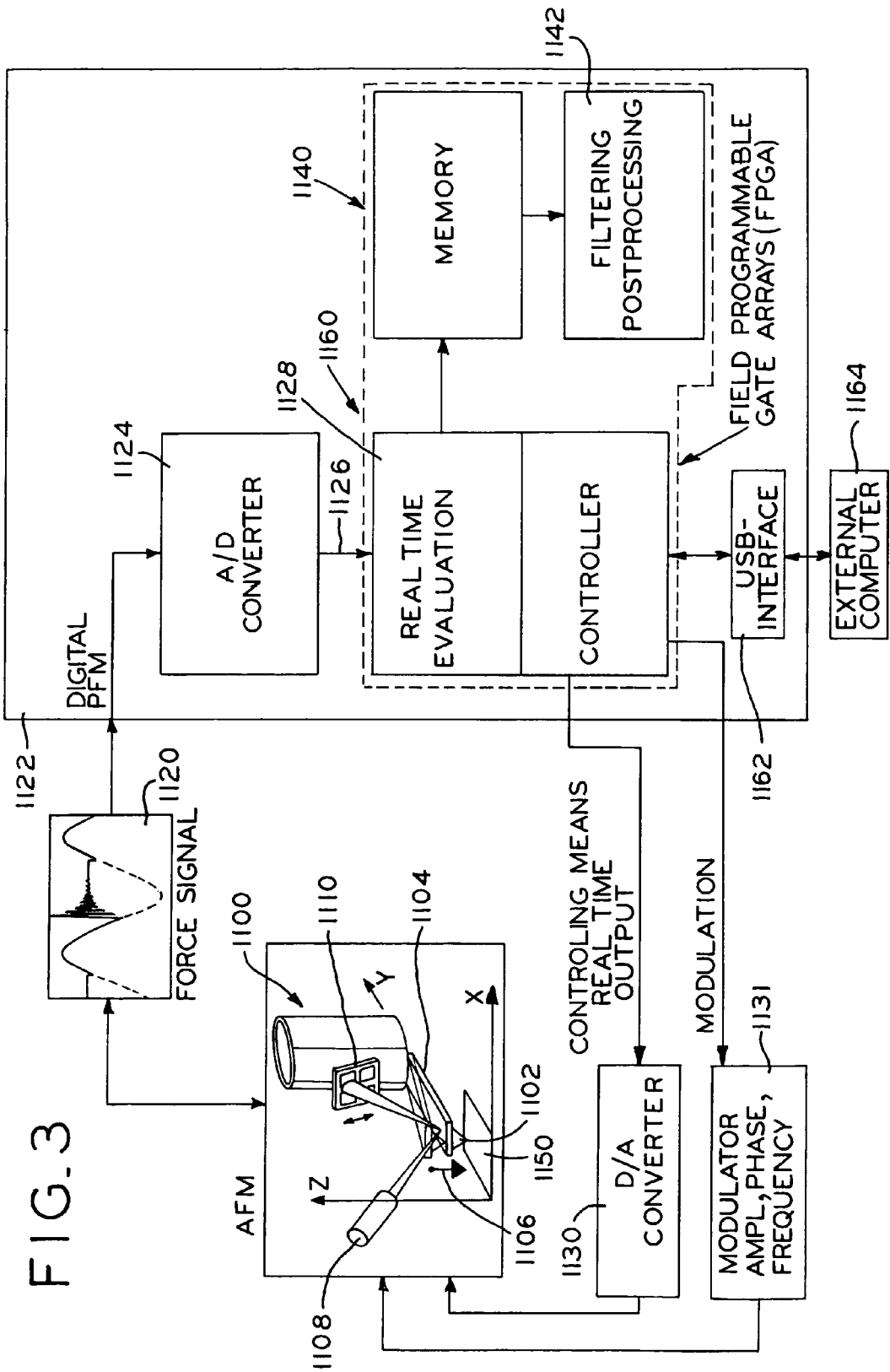
FIG. 3 shows a block diagram of a scanning probe microscope with a programmable logic device.

By way of example, FIG. 3 shows a block diagram of the configuration of a scanning probe microscope in accordance with the invention with a programmable logic device. The scanning probe microscope is indicated by reference numeral 1100. The scanning probe microscope comprises a scanning probe 1102, which is for instance a tip. The scanning probe is suspended on a beam 1104. The scanning probe is set in motion to oscillate along the z axis 1106, i.e., perpendicular to the sample surface. The deflection of the beam 1104 on which the tip 1102 is arranged is evaluated by means of a reflected beam emitted by a laser diode 1108 that is detected by a four-quadrant detector 1110. The analog force measurement signal which is obtained by the deflection of the beam 1104, also known as a cantilever, is indicated by reference numeral 1120. The analog force signal 1120 is transmitted to a control unit 1122 in accordance with the invention. The control unit 1122 comprises an A/D converter 1124 which converts the analog data of the force signal 1120 Into a digital data stream 1128. The digital data stream is communicated to a programmable logic device, developed here as an FPGA, without the interconnection of a bus system. The embodiment only shows an A/D converter 1124, This is a simplified representation. Provision is made for at least four A/D converters in preferred systems, namely one each for the x-axis and the y-axis that characterize the plane on which the scanning platform with the sample 1150 is displaced beneath the scanning probe 1102, and also an A/D converter for the Z axis. Consequently, in the form of a digital data stream, these 3 A/D converters serve to provide the position of the scanning platform in all three dimensions to the programmable logic device 1160, developed as a field programmable gate array (FPGA). In addition, provision is made for one or a plurality of A/D converters to receive the measurement signal, in this case the force-time signal. The digital data stream of the A/D converters is fed to the programmable logic device 1160 in parallel, and therefore simultaneously, being processed simultaneously by this device. Preferably, the A/D converters have a width of 14 bit or more. With the aid of the programmable logic device, the real-time A/D converter signals are evaluated in real time. Real-time is defined such that the result of the evaluation is definitely available for the tip 1102 within a fixed predetermined interval, in this case no later than the end of the current modulation cycle, so that the result can be used as an actual value for a controller. The closed loop control is performed by a controller, that in turn constitutes one component of the field programmable gate array (FPGA). The programmable logic device 1160 (FPGA) directly controls one D/A converter or a plurality of D/A converters without the interconnection of a data bus. Preferably, the D/A converters 1130 are those with a width of 14 bit or more. Preferably, provision is made in the scanning probe microscope in accordance with the invention with programmable logic for at least three D/A converters, specifically in order to displace the sample along the X, Y and Z axes in the three dimensions. The programmable logic device can for instance be developed as field programmable gate arrays (so-called FPGAs). Such programmable logic devices have been described for example in Ashok K. Sharma: "Programmable Logic Handbook: PLDs, CPLDs and FPGAs (McGraw-Hill Professional Publishing; ISBN: 0070578524)" or in W. Bolton, Bill Bolton: "Programmable Logic Controllers: An Introduction" (Butterworth-Heinemann; ISBN: 0750647469).

When a control variable of a scanning probe microscope in pulsed force mode is described, the following values can be taken into consideration for instance for closed-loop control purposes; the constant maximum force (taking measurement artifacts resulting for instance from interference or long-range forces into account), the constant energy input, the constant insertion depth etc. or combinations of these quantities.

The actual controller quantity is calculated in the programmable logic device, The control variables from the programmable logic device are transmitted without the interconnection of a data bus to one or a plurality of D/A converters 1130, for instance to transport the sampling platform in the three spatial dimensions, or to a modulator 1131 to modulate the amplitude, phase and frequency of the tip 1102 of the scanning probe microscope 1100. Thanks to the architecture of the programmable logic device 1160, the D/A converter and the modulator can be controlled in parallel mode. The programmable logic device 1160 of the system shown in FIG. 3 is connected to at least three peripheral components 1124, 1130, 1131.

The modulator 1131 makes it possible to control the vertical oscillation of the measurement tip in pulsed force mode. The digital configuration makes it possible to employ any number of curve forms for modulation. In addition to interactive user access, the close connection to the real-time evaluation described above also makes it possible by means of control parameters to automatically control the phase, amplitude and frequency of modulation, permitting for example the correction of piezo non-linearities In the scanning probe microscope.

In addition to real-time control, real time evaluation employing the programmable logic device 1160 makes it possible to store some of the data in a memory in the programmable logic device, The data in the memory area 1140 can be subjected to post-processing 1142 or filtering. An external computer 1164 can be connected to the programmable logic device by means of an interface, for instance a USB interface 1162, which in turn is linked directly to the programmable logic device 1160. The external computer serves to input the measurement and control variables and also to act as a storage medium for measurement data. Within the scope of this application, the USB interface is a peripheral component.

Figure 4:
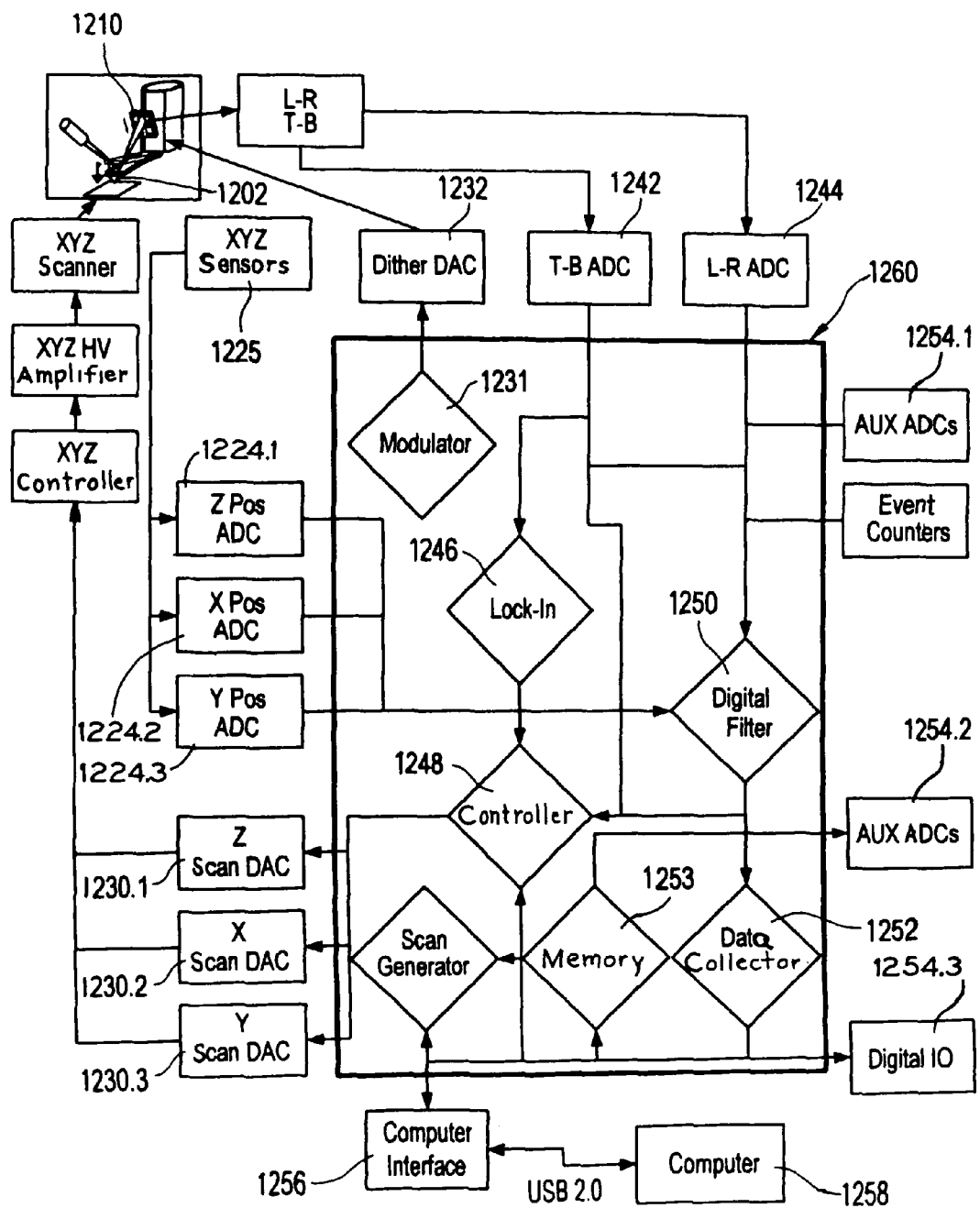
FIG. 4 shows an alternative system with a programmable logic device.

FIG. 4 is a detailed embodiment of a scanning probe microscope with a programmable logic device represented in accordance with the invention. The same components as in FIG. 3 have reference numbers that are greater by 100. In the embodiment in accordance with FIG. 4, in addition to the programmable logic device recording and evaluating the measured values, the movement of the sample or scanning platform in all three spatial dimensions is controlled, as is the oscillation of the peak force of the scanning probe microscope.

The three A/D converters 1224.1, 1224.2 and 1224.3 connected to the programmable logic device for receiving the position of the scanning platform via the X, Y and Z sensors 1225 are easily recognizable. The feedback data for controlling scanning are provided by means of the D/A converters 1230.1, 1230.2 and 1230.3 and transmitted to the controller. The central processing unit embedded in the programmable logic device generates the signal for the modulator 1231 used to control the modulation of the force tip 1202 via the digital output 1232. Furthermore, the four-quadrant detector 1210 of the scanning probe microscope is connected with the programmable logic device 1260. The four-quadrant detector 1210 receives a left/right signal via input TB/ADC 1242 or LR/ADC 1244. These signals are processed in the programmable logic device and fed to a lock-in amplifier 1246 or controller 1248 which is also developed in the programmable logic device. The scanning platform is controlled by the controller 1248 via the digital outputs 1230.1, 1230.2 and 1230.3 and moved into the corresponding position. The force tip 1202 is actuated by means of the sinus generator or modulator 1231 via the output 1232. Furthermore, the programmable logic device 1260 comprises a digital filter 1250 for the recorded data and areas 1252, 1253 for collecting and storing the available data. The programmable logic device can also optionally be connected to auxiliary A/D converters, i.e., Aux/ADC 1254.1 and Aux/DAC 1254.2, and digital input and output devices 1254.3. The data stored in the data storage device 1252 can be transmitted via a computer interface 1256 or a USB interface to an external computer 1258 and stored there. The computer 1258 can also serve to set the measurement parameters etc. In accordance with the invention, as a peripheral component the interface 1256 is connected directly to the programmable logic device 1260.

Consequently, the invention also makes known for the first time an apparatus that makes it possible to execute a plurality of parallel input/output operations in the peripheral component directly without interconnection of data busses to a programmable logic device. The programmable logic device encompasses not only a means for evaluating the data provided in digital form, but also for instance for controlling the input/output interfaces and the closed-loop control of the sample platform that can be displaced along the X, Y and Z axes, and also for actuating the 'field tip'.

The configuration of the programmable logic device as presented in the invention, which controls A/D converters, D/A converters and digital I/O connections and encompasses controllers or lock-in amplifiers, can be employed not only in scanning probe microscopes, but also generally in other measurement devices, also in particular in microscopes, especially in scanning measurement systems, such as scanning force microscopes, scanning tunneling microscopes, optical near-field microscopes, confocal laser scanning microscopes, confocal scanning microscopes, confocal Raman scanning microscopes and photonic force microscopes.

The invention thus provides a method and an apparatus for the first time for performing a method which allows precisely determining a large number of variables which are characteristic for a specimen by means of a single measurement and obtaining therefrom the imaging of different physical surface properties.

The invention claimed is:

1. A scanning probe microscope, comprising a programmable logic device, wherein said programmable logic device is realized by field programmable gate arrays (FPGA).

2. A scanning probe microscope, comprising:
a programmable logic device, wherein said programmable logic device has a large number of logic components interconnected using a net list and by means of freely configurable circuits in accordance with a circuit diagram and said programmable logic device is realized by a field programmable gate array (FPGA);
wherein said field programmable gate array provides for:
a real time evaluation,
a controller,
a memory,
filtering, and
postprocessing.

3. A scanning probe microscope according to claim 2, wherein the microscope further comprises a peripheral electrical component which is connected to the programmable logic device without the interconnection of a data bus.

4. A scanning probe microscope in accordance with claim 2, wherein the microscope comprises at least two peripheral components, with both peripheral components being connected directly to the programmable logic device without the interconnection of a data bus.

5. A scanning probe microscope in accordance with claim 3, wherein the programmable logic device controls the peripheral components directly.

6. A scanning probe microscope in accordance with claim 4, wherein the programmable logic device controls the peripheral components directly.

7. A scanning probe microscope in accordance with claim 2, including peripheral components that comprise one or a plurality of the following components:
an A/D converter (ADC)
a D/A, converter (DAC)
a digital input and output (DIO)
a digital output (DO)
a digital signal processor (DSP)
a microprocessor
a further programmable logic device.

8. A scanning probe microscope in accordance with claim 7, wherein the A/D converter is an A/D converter with a width equal to or greater than 14 bits and/or an A/D converter with a sampling rate in excess of 100 ksamples/s.

9. A scanning probe microscope in accordance with claim 2, wherein the microscope comprises a D/A converter with a width equal to or greater than 14 bits and/or a sampling rate greater than 100 ksamples/s.

10. A scanning probe microscope, in accordance with claim 7, wherein the digital input and output (DIO) is one of the following interfaces:
an RS232 interface
a I2C interface
an Ethernet interface
a USB interface.

11. A scanning probe microscope in accordance with claim 7, wherein the digital input and output (DIO) is a control interface for one or more of the following components:
filter disks or filter sliders
laser illumination units,
electric rotary table drives
spectrometers or spectrographs
CCD cameras
an interface for controlling a scanning system and inputting its data.

12. A scanning probe microscope in accordance with claim 7, wherein the digital output is one or a plurality of the following output units:
a digital output unit that can control stepper motors
a digital output unit that can control folding mirrors
a digital output unit that can control shutters or acoustooptic modulators
a digital output unit that can switch detectors or their functions on and off
a digital output unit that can switch detectors or their functions on and/or off as a function of the measured counting rate.

13. A scanning probe microscope in accordance with claim 2, wherein the microscope comprises at least a first Peripheral component and also at least a second peripheral component, with the first peripheral component being an A/D converter that receives a measurement signal and provides a digital measurement data stream.

14. A scanning probe microscope in accordance with claim 13, including a second peripheral component that is a D/A converter that provides an analog signal to control the microscope.

15. A scanning probe microscope in accordance with claim 11, wherein the first mentioned programmable logic device encompasses an evaluation area that evaluates a first data stream from a first peripheral component.

16. A scanning probe microscope in accordance with claim 15, wherein the first mentioned programmable logic device encompasses a control area that obtains a second data stream made available to a second peripheral component.

17. A scanning probe microscope in accordance with claim 16, including a second peripheral component that is a D/A converter that is designed in such a manner that provision is made for a positioning device for positioning and scanning a sample in one, two or three dimensions.

18. A scanning probe microscope in accordance with claim 2, wherein the first mentioned programmable logic device is configured such that all simultaneously occurring processes can be processed in parallel.

19. A scanning probe microscope in accordance with claim 2, with the microscope being one or a plurality of the following microscopes:
a scanning force microscope
a scanning tunneling microscope
a laser scanning microscope
a photonic force microscope.

20. The scanning probe microscope of claim 7, wherein the A/D converter has a width equal to or greater than 16 bits and a sampling rate in excess of 5 Msamples/s.

21. The scanning probe microscope of claim 9, wherein the A/D converter has a width equal to or greater than 16 bits and a sampling rate in excess of 5 Msamples/s.

* * * * *